//2,725,679

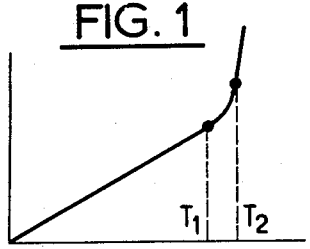
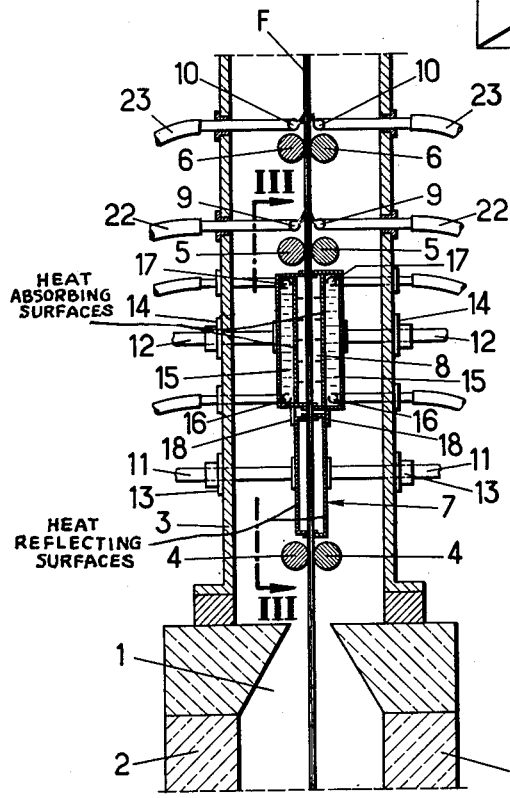
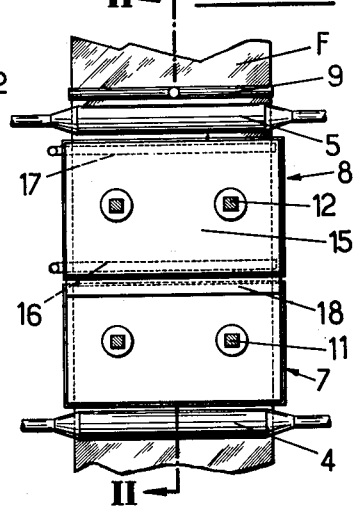
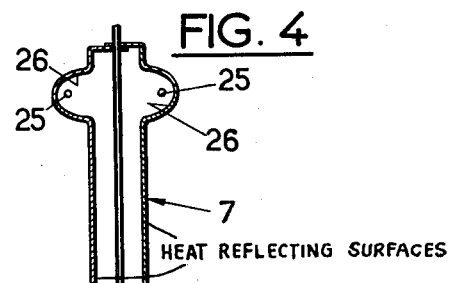
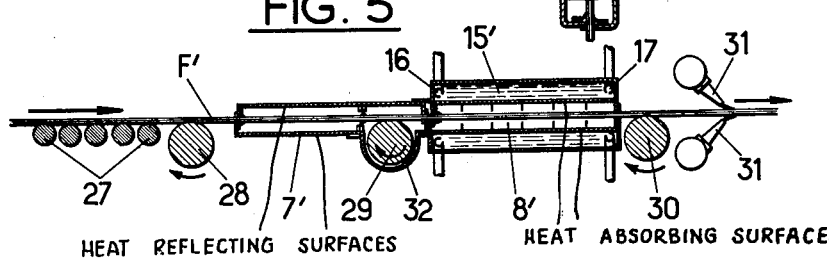

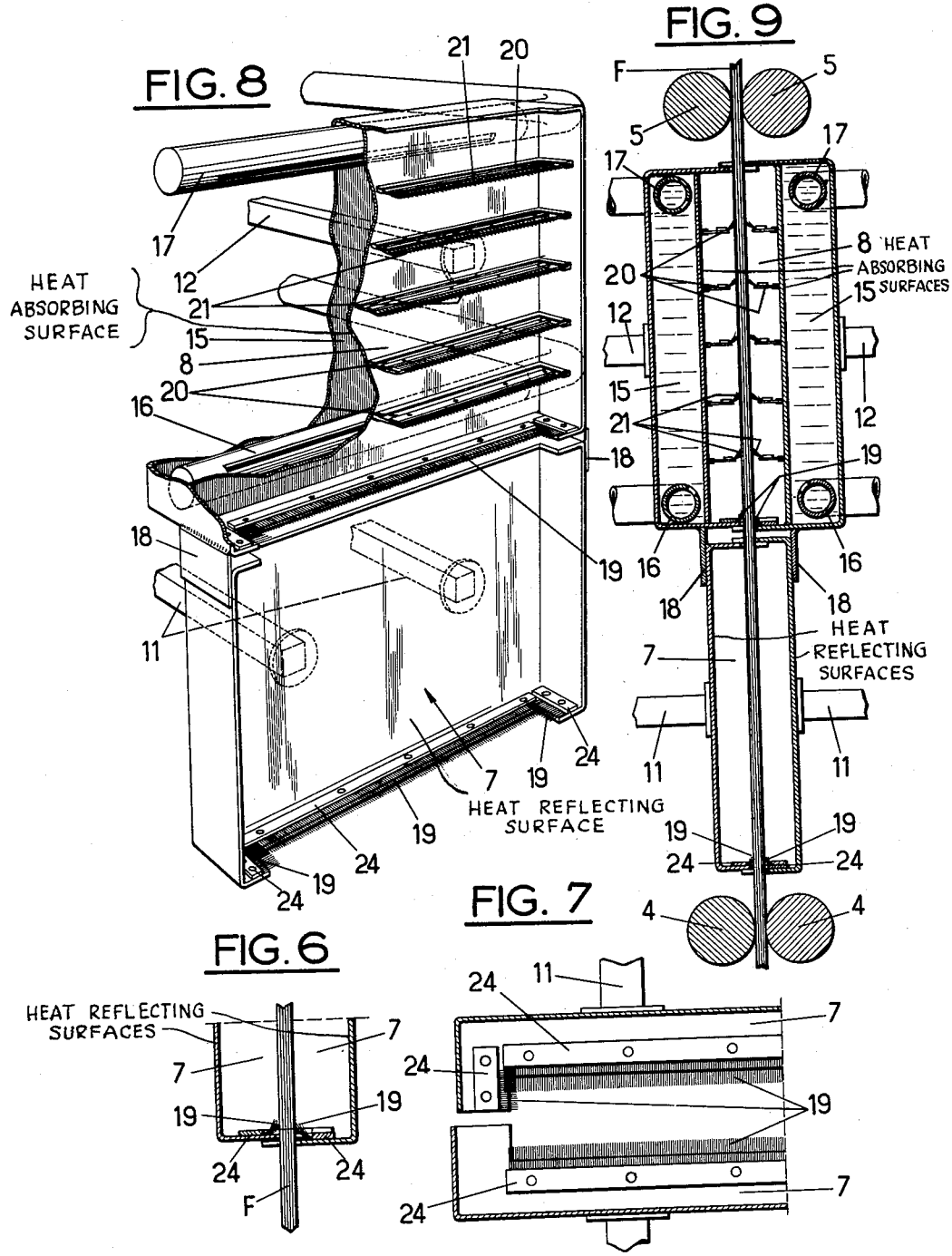

APPARATUS FOR THE RAPID ANNEALING OF GLASS SHEETS IN A CONTINUOUS PROCESS

Bernard Long, Paris, France, assignor to Compagnies Reunies des Glaces & Verres Speciaux du Nord de la France, Paris, France, a corporation of France Application March 27, 1953, Serial No. 345,087

Claims priority, application France April 8, 1952

5 Claims. (Cl. 49—47)

It is known that the industrial annealing of glass sheets produced by a continuous process, for example, window glass, plate glass, etc., does not completely eliminate permanent internal strains which are revealed by the observation of double refraction at the room temperature when the sheets are viewed parallel to their surfaces.

It is also known that it is just as well, from a practical point of view, that the glass does retain a slight residue of permanent internal strains, which residue is characterized by a slight compression of the surface layers. This is because this residue of strains confers on them, in general, a better mechanical endurance as well as a better resistance to sharp changes in temperature.

The industrial annealing of glass sheets, which cannot be a perfect annealing, is limited to the attainment of two principal objectives:

(a) To assure a good distribution of residual internal strains, in other words make the strains uniform all along the surface and symmetrical in the thickness.

(b) To reduce the intensity of the stains below a certain limit.

For each particular product, the problem consists in attaining a compromise between these two objectives, a compromise permitting the satisfaction of all the practical commercial needs for the particular type of glass under consideration. The essential characteristic required for practical utilization of glass is that it may be cut without excessive difficulty and with a minimum of losses. To obtain this result, it is necessary to bring about a degree of compression in the "skin" of the sheets which must not be too high in order that the cutting of this "skin" by the cutting tool may not be too difficult. But it is also necessary, and this is even more important, that there not be in the skin any regions or lines in the neighbourhood of which the degree of compression varies rapidly and, a fortiori, that there not be, besides zones under compression, zones under expansive strain in order that cutting lines traced by the tool may not risk fracturing the sheet in unintended directions, with a consequent waste of material.

The industrial annealing of glass sheets, in actual practice requires, in general, an amount of work all out of proportion to the result attained; the operation is long and its cost is far from negligible. Modern annealing ovens are quite bulky in construction and their initial cost and their upkeep are relatively high.

It must nevertheless be recognized that continuous vertical processes of drawing window glass effect a relatively rapid annealing in crude cooling jackets which function, in general, without application of heat. But it is certain that these arrangements are clearly defective, when it is a matter of annealing in a continuous manner sheets having a thickness in excess of three millimeters; cutting of such sheets results in substantial losses to the user and the distributor as well as to the manufacturer.

The primary object of this invention is to provide a process of industrial annealing designed to remedy those difficulties which have just been described, a process permitting the rapid, sure and simple obtaining of drawn or cast sheets, as preferred, thanks to a good distribution of permanent internal strains and the low intensity of these strains, which guarantees results superior to those given by sheets of the same thickness annealed by other processes now actually in use.

The aforesaid process is essentially characterized by the fact that the cooling of the sheets in the course of annealing is obtained by radiation, all cooling by convection being suppressed as completely as possible.

The process constituting this invention is particularly adapted to continuous manufacture by drawing or casting, and comprises three successive operations:

1. After the sheet has been formed in the usual manner, it is moved through an enclosure in which the temperature of the sheet may be equalized and from which it emerges having an equal temperature at all points, which temperature is higher than the temperature $T_2$ at the upper end of the elbow which occurs in the curve of expansion of the glass as it changes from the fluid to the solid state. (See Figure 1 of the attached drawings.)

2. Immediately after the operation of equalizing its temperature, the sheet is introduced into another enclosure in which it is cooled evenly, solely by radiation, under conditions such that the effect of convection is rendered absolutely negligible, to a point at which the sheet reaches a temperature lower than the temperature $T_1$ at the lower end of the elbow which occurs in its curve of expansion as it changes its state. (Figure 1.)

3. As it leaves the enclosure for cooling by radiation, the sheet moves forward and undergoes a uniform convective cooling by means of air currents until its temperature is sufficiently low for it to be cut. All irregular cooling of the surfaces by reason of the capricious nature of natural convection is thus avoided and, as a consequence, those cracks and fractures due to transitory strains.

In an optional step in my process, the sheet is submitted, immediately after the step of equalizing its temperature heretofore described under 1, to a heating by radiation for a short time, this heating being designed to create a certain temperature gradient between the inner layer of the sheet and its surfaces, the latter being at a higher temperature.

In this optional step, immediately after its heating, the sheet undergoes the cooling by radiation without convection heretofore set forth as step 2, followed by the final convective cooling by compressed air.

The three fundamental steps of my process will now be explained more completely, and a step corresponding to this optional one may be inserted between the first two.

The first step, designed to equalize the temperature of the sheet, must obviously be taken at a time when there is still sufficient excess heat in the warmest parts of the sheet to bring its coolest parts to a fixed uniform temperature, which is above the higher temperature $T_2$ of the elbow in the curve of expansion.

It is advisable that this uniform temperature not be too high in order to avoid all risk of distortion. The point at which the temperature equalizing step begins and the time necessary to obtain this equalization are obviously determined by the manner in which the sheet is formed and the thickness thereof.

Appropriate means for bringing about this equalization will be described later; for the present it will merely be stated that it is brought about very rapidly through the interplay of reciprocal radiations from different parts of the sheet and by means of reflected radiations from the inner surface of the chamber which surrounds the sheet. In order to satisfy the condition already laid down that there be no heat exchange, this inner surface must necessarily have a reflecting power in the neighbourhood of unity.

It is obvious that the time required to equalize the temperature is shorter when the glass is less absorbent of infrared radiations. To be specific, it may be said that the time required is less than two minutes in the case of a sheet of ordinary clear glass five millimeters in thickness moving vertically.

The second step presents a new characteristic which constitutes an essential feature of the invention, which consists of making a thick sheet of glass pass quickly through the critical temperature zone which surrounds the elbow in the curve of expansion, solely by means of cooling by radiation, which secures the remarkable advantage of causing a minimum temperature gradient in each part of its thickness.

As a result, the cooling by radiation affects simultaneously the surface of the glass and the layers underlying the surface. Even though not of equal efficacy in these two regions by reason of absorption by the material, the difference in temperature which it causes between the surfaces and the middle layer of the sheet is small; there is thus solidification under a small temperature gradient and the final result at room temperature is that the permanent internal strains are small; in particular, the surface film is but slightly compressed.

It being given that cooling by radiation may be produced uniformly on each of the surfaces and that it is easy to arrange that it be of equal intensity on the two surfaces, the small permanent internal strains which affect the sheet after annealing are uniform in area and distribution with respect to the thickness; consequently, they are not troublesome in the use of glass, in particular in its cutting.

The process is even more satisfactory when the glass is less absorbent of infra-red rays, since in that case the temperature gradient in proportion to the thickness is even slighter.

The efficiency of the process may be improved by utilizing the optional step heretofore described, that is, by adding a brief period of heating by radiation after the equalization of the temperature. By means of this supplemental step a temperature gradient is created in advance which is contrary to that resulting from cooling by radiation and it will be understood that these two gradients, by at least partially neutralizing each other, make it possible to produce with a still closer approximation a simultaneous passage through the critical zone of solidification by the heart of the sheet and by its skin.

The radiation used to produce the aforesaid heating, possesses, of course, the desired quality of penetrating to the heart of the sheet.

The process constituting my invention permits sheets produced in a continuous process and having a thickness up to ten millimeters to pass quickly and successfully through the elbow of the curve of expansion when used either with glass moving vertically all the way to solidification, or glass drawn vertically and then turned horizontally, or cast glass moving horizontally.

In the case of a thickness of five millimeters, the time required for the second of the aforesaid steps, with or without the supplemental step of brief heating, does not exceed two minutes.

It should be noted that since most industrial soda-lime glasses do not contain too great impurities increasing absorption of infra-red rays, cooling by means of radiation only, without convection, is still advantageous below the temperature at which the elbow in the curve of expansion begins. The limit under these circumstances is situated near 400 degrees C.

The third step of the process according to my invention has no effect on the permanent strains; it has no purpose other than to avoid temporary strains and irregularities capable of causing cracking in the course of manufacture; at the same time, this step has the advantage of bringing the sheets more rapidly into a state in which they can be handled.

The rapidity of this final cooling by forced convection using air blown against the two surfaces of the sheet is a function of the thickness; its duration may be less than a minute for a thickness of five millimeters.

What has already been disclosed demonstrates amply that the process of rapid continuous annealing of sheets according to my invention differs fundamentally from the processes of industrial annealing now actually in use, specifically in the following points:

1. The method of equalizing the temperature.
2. The method of passing very quickly through the critical zone of temperature.
3. The exceptional speed of these two operations.
4. The safety and speed of final cooling which is the result of these preceding operations; this step presenting the dominant characteristics of cooling by radiation, without any effect from convection.

Another object of the invention is the provision of apparatus carrying out the process hereinbefore described, and this apparatus includes the following essential elements:

(a) For the first step; reflecting means completely surrounding the sheet and capable of rapidly equalizing the temperature in all parts of the sheet at a value higher than that of the highest temperature of the elbow of the curve of expansion. This reflecting means has as low a capacity as possible for absorbing heat and its interior surface is endowed with as high a reflecting power as possible for the radiations from the glass in the zone of temperatures in the neighbourhood of those at the elbow of the curve of expansion.

These conditions are, in general, satisfied by a thin metal envelope of a material such as sheet aluminum, the interior surface of which has been electrolytically polished, or sheet steel carrying a coating of polished chrome, either assuring a reflecting power as high as possible.

It may be desirable for the outer surface of the reflector to have a low heat loss by radiation; in that event it is also given a high power to reflect infra-red radiation, which carries with it a low power to emit heat.

(b) An absorbent element which completely surrounds the sheet and which cools it rapidly by radiation throughout its thickness, to a temperature below that at the elbow of the curve of expansion, this cooling being accomplished in such a manner as to avoid as completely as possible all loss of heat from the sheet by convection, that is to say, all circulation of air in contact with its surfaces.

These conditions are, in general, satisfied by the two following means:

1. A box having double walls serving as a water jacket made, for example, of sheet steel, its innermost surface being covered with a black coating of a type such that the absorbent element in question has properties as near as possible to those of a "black body";
2. The application to the inside of this double walled box between its absorbent innermost surface and the surfaces of the sheet, of two series of walls or baffles of a light material, perpendicular to the direction of movement of the sheet, these baffles opposing the free circulation of air in the interior of the jacket.

In carrying out the optional step heretofore mentioned, the short heating by radiation to which the sheet is subjected at its departure from the reflector is accomplished by heating means, such as, for example, two incandescent bodies provided with reflectors and positioned on opposite sides of the sheet.

It should be noted that it is important that the reflecting means and the absorbing means be as perfectly closed as possible in order to avoid producing inside these devices any circulation of streams of ambient air capable of irregularly cooling the surfaces and the edges of the sheets. It is accordingly necessary that the entrance and exit from these two devices be provided with flexible screens closing the free spaces between the aforesaid elements and the sheet;

(c) The final cooling means permit the surfaces of the sheets to be swept uniformly by the air. Such means are easily provided and may consist of a blowing pipe placed on each side of the sheet, or better still, of two spaced series of such pipes.

The devices which have just been briefly described can be made in different ways. By way of illustration only, and without in any way limiting the scope of the invention, specific means for carrying out the invention are illustrated schematically in the accompanying drawings, in which:

Figure 1 represents the curve of expansion of glass; this shows the "elbow" already mentioned, which begins at the temperature $T_1$ and which ends at the temperature $T_2$;

Figure 2 is a partial vertical cross-section taken along the line II—II of Figure 3, showing a drawing chamber and an annealing casing for a sheet of vertically drawn glass F according to one of the processes actually used;

Figure 3 is a cross-section along the line III—III of Figure 2 showing both of the two first pairs of rollers together with those portions of the sheet extending a short distance before the first pair and a short distance after the second pair of rollers.

On Figures 2 and 3 the portion of the sheet between the two pairs of rollers is encircled first by the reflecting means and then as it moves upward by the absorbing means.

Figure 4 is a schematic vertical cross-section showing means for carrying out the optional step of the invention previously mentioned, the figure showing only the reflecting means;

Figure 5 is a vertical longitudinal cross-section showing the application of the invention to a sheet produced by continuous casting, the drawing showing only that portion of the apparatus extending from a short distance before the entrance of the sheet into the reflecting means to a short distance after the point at which the same sheet leaves the absorbing means;

Figure 6 is a fragmentary vertical cross-section on an enlarged scale of the lower part of the reflecting means showing a detail thereof;

Figure 7 is a partial horizontal cross-section on an enlarged scale of the reflecting means;

Figure 8 is a perspective view of the reflecting and absorbing means, with part of the casing broken away; and Figure 9 is a vertical cross-section showing part of Figure 2 on an enlarged scale.

As seen in Figure 2, the drawing chamber 1, surrounded with refractory brickwork 2, is surmounted by annealing casing 3 represented for purposes of simplification in a schematic manner without its lateral openings, inspection ports, or like accessory features.

The sheet of glass F is drawn in a known manner by means of pairs of rollers 4—4, 5—5, 6—6, etc. The reflecting means 7 is positioned between the pairs of rollers 4—4 and 5—5, just above the lower pair, and, immediately above reflecting means is the absorbing means 8. Both encircle the sheet on all sides as completely as possible.

Above the second and third pairs of rollers 5—5 and 6—6 are the pairs of blowing pipes 9—9 and 10—10.

Each of the devices 7 and 8 is formed of two halves, one of which is adapted to fit into the other to form a box so as to leave nothing between them but two slots for the passage of the sheet F.

Each half of the reflecting means 7 is equipped with two adjusting rods 11; likewise the halves of the absorbing means are fixed to adjusting rods 12. These adjusting rods pass through guides 13 and 14 fixed on the walls of the casing 3. This arrangement makes it possible to separate the two halves of the devices 7 and 8 or bring them closer together easily whenever that is necessary.

The halves forming the reflecting means are of thin sheet metal and their interiors are so made as to reflect infrared radiation. This result may be obtained by using electrolytically polished sheet aluminum or sheet steel smoothly coated with polished chrome.

The two halves of the absorbing means 8 may be made, for example, of sheet smooth steel, coated on the inside with a black absorbent coating. Those surfaces which lie opposite the surfaces of the sheet F are vigorously cooled by the circulation of water in the jacket 15 at the back of the absorbing means 8, at the upper and lower ends of which jacket are disposed the inlet and outlet pipes 16 and 17 respectively for circulating the water. These pipes may, for example, be provided with longitudinal slits permitting the free passage of cooling water, as shown in greater detail in Figure 9.

On three sides of the water jackets the metal sheets of which they are made extend downward to form the flanges 18 which fit over the halves of the absorbing means 7 and thus assure a satisfactorily tight fit between the reflecting means and the absorbing means.

It is an essential feature of the process according to my invention that no appreciable circulation of cold air currents in contact with the sheet F be permitted, in order to avoid as strictly as possible any convection. To obtain this result the apparatus employs the two following means:

First, the enclosure of the lower space between the halves of the boxes 7 and 8, on the one hand, and the sheet on the other hand, is accomplished by means of dense curtains of elastic "bristles" 19 (Figures 6 and 9), for example, brass bristles, that is to say, very fine filaments of that alloy, fixed in place by fillets, these curtains rubbing lightly over the glass without causing the least injury to its surface, due to their great fineness and assuring nevertheless a very effective tightness.

Secondly, the interior of the half-boxes constituting the absorbing means 8 is partitioned by a convenient number of horizontal strips 20, which extend horizontally to the neighbourhood of the glass sheet. These strips may be fixed to the back of the boxes, as indicated schematically in Figures 8 and 9, or held in place on screw threaded rods by means of nuts and supported at the same time on three of their sides by means of a guard ring composed of an insulating material in the form of a U provided on the inside of the boxes, insuring their tightness and thermally insulating the strips 20 from the cooled parts of the boxes.

The strips 20 are made of a light thin metal, preferably of thin tinsel having a polished surface. They may most easily be described as impeding the circulation of air inside the boxes 8 and consequently opposing the phenomenon of convection. By increasing the number of strips the movement of air in contact with their surfaces is more effectively prevented.

For a given number of strips, the efficiency of the apparatus may be increased by providing the inner side of each strip (that is to say, the edge of the strip situated on the side of the sheet F) with a band of elastic bristles (for example, bristles of brass such as those hereinbefore described) brushing against the glass, as shown at 21 on Figures 8 and 9.

Above the pairs of rollers 5—5 and 6—6 are the blowing pipes 9—9 and 10—10 provided with air under high pressure through tubes 22 and 23; these pipes serve to uniformly cool the sheet to prepare it quickly and safely for disposition by the cutting foreman.

It should be noted that since it is advisable on principle to maintain the casing 3 at a certain height above the first rollers, it is evident that large surfaces of this casing may be entirely open for the major part of its height, both to make the essential parts of the annealing apparatus more accessible and to reduce the troublesome draft of which this casing is ordinarily the source.

On Figure 6, the half-box 7 carries at its lower part the reglets 24 which serve to fix two sets 19 of brass filaments in place, the first set bearing lightly on the right surface of the sheet and the second bearing lightly on the opposite surface thereof.

Figure 7 shows in horizontal cross-section two sets 19 of brass filaments in the box 7. It will be easily appreciated that by associating the three sheets of filaments of each half-box with those of the corresponding half-box in which it engages, it is possible to prevent all unwanted penetration of air through the lower part of the reflecting means 7.

Figure 4 illustrates the optional step of the process of my invention according to which the sheet is heated briefly by radiation before the cooling by radiation by means of the absorbing means 8. In the arrangement shown by way of example for carrying out this optional step, the heating apparatus comprises two radiators, each comprising an electrically heated resistor at the temperature desired which occupies the focal line of a curved reflector 26 stamped from the side of the half-box 7. This reflector is preferably parabolic in cross-section.

Figure 5 shows schematically the application of the invention to the case of a cast sheet F'. The sheet, shortly after its formation, is supported by a series of small closely spaced rollers 27; it is then moved and carried by the rollers 28, 29 and 30. Between the roller 28 and the roller 29, the sheet undergoes the equalizing step by means of the reflector 7' which completely encircles the sheet and which is built in the same manner as the ones shown in Figure 2. Between the rollers 29 and 30 the sheet undergoes the cooling by radiation, without convection, in the absorbing means 8', which encircles it completely and which is constructed in the same way as the absorbing means 8 already described, the cooling being accomplished likewise in the same manner, by means of the jacket 15' for the circulation of water. After passing the third roller 30 the sheet is given its final cooling by means of compressed air from the nozzles 31.

In order to avoid the entrance of air through the spaces between the means 7' and 8' and the roller 29, the air about this last roller is insulated by means of a casing of sheet metal 32 which extends over a part of the adjacent boxes 7' and 8'. If the temperature of the surface of the roller 29 becomes dangerously high, the coolness of the casing 32 can be assured by doubling it and circulating a current of water through the box thus formed.

It will be appreciated that the detailed means for carrying out the invention described have been only by way of illustration and they may be modified in many ways and certain elements may be replaced by equivalent elements without departing from the spirit of the invention, provided its essential character is respected according to which the operation of cooling or annealing of a sheet of glass (continuously drawn by any suitable means) is definitely by radiation, to the exclusion as completely as possible of convection.

What I claim is:

1. Apparatus for rapidly annealing continuously produced glass sheets comprising heat reflecting means composed of a pair of metallic half-boxes the interior surfaces of which are highly reflective, heat absorbing means composed of a pair of metallic half-boxes the interior surfaces of which have a high capacity for absorbing heat, each of these means completely surrounding the sheet, and means for progressing the sheet first through the heat reflecting means and then longitudinally through the heat absorbing means, said sheet passing through narrow gaps between the two pairs of half-boxes.

2. Apparatus as claimed in claim 1, in which curtains of metallic filaments are located at the gaps between said half-boxes.

3. Apparatus as claimed in claim 2 comprising means for heating said sheet, said means being disposed between the entrance to said heat reflecting means and the entrance to said heat absorbing means.

4. Apparatus as claimed in claim 3 in which said auxiliary heating means comprises two electrically heated resistors symmetrically disposed on opposite sides of the sheet and occupying the focal line of a parabolic reflector.

5. Apparatus as claimed in claim 1 in which each of the half-boxes constituting the heat absorbing means is fitted with thin transverse metallic strips serving to reduce the movement of air therein.

References Cited in the file of this patent

UNITED STATES PATENTS

| | | |
|---|---|---|
| 1,771,180 | Kutchka | July 22, 1930 |
| 1,830,788 | Forman | Nov. 10, 1931 |
| 1,836,409 | Trinks et al. | Dec. 15, 1931 |
| 1,841,548 | Nobbe | Jan. 19, 1932 |
| 1,865,811 | Amsler | July 5, 1932 |
| 1,999,588 | Fox et al. | Apr. 30, 1935 |
| 2,026,781 | Geer | Jan. 7, 1936 |
| 2,062,836 | Scott | Dec. 1, 1936 |
| 2,278,328 | Magrini | Mar. 31, 1942 |
| 2,418,489 | Tillyer | Apr. 8, 1947 |
| 2,553,945 | Schrader | May 22, 1951 |

FOREIGN PATENTS

| | | |
|---|---|---|
| 475,181 | Great Britain | of 1937 |